United States Patent [19]

Iriyama

[11] 4,365,826
[45] Dec. 28, 1982

[54] STEERING COLUMN SUPPORTING STRUCTURE FOR MOTOR VEHICLE

[75] Inventor: Toru Iriyama, Hiroshima, Japan

[73] Assignee: Toyo Kogyo Co., Ltd., Horishima, Japan

[21] Appl. No.: 178,631

[22] Filed: Aug. 15, 1980

[30] Foreign Application Priority Data

Aug. 21, 1979 [JP] Japan .......................... 54-115470[U]

[51] Int. Cl.³ .............................................. B62D 1/16
[52] U.S. Cl. ..................... 280/779; 180/90; 296/193
[58] Field of Search ................. 280/779; 180/90; 296/70, 72, 192, 208, 185, 186, 193, 194, 203, 205, 146

[56] References Cited

U.S. PATENT DOCUMENTS

| | | | |
|---|---|---|---|
| 2,651,986 | 9/1953 | Greig | 180/90 |
| 2,933,341 | 4/1960 | Muller | 296/204 |
| 3,279,816 | 10/1966 | Issigonis | 296/204 |
| 3,321,235 | 5/1967 | Muller et al. | 296/204 |
| 3,423,122 | 1/1969 | Wessells | 296/185 |
| 3,791,693 | 2/1974 | Hellriegel et al. | 296/146 |
| 3,856,103 | 12/1974 | Scholz et al. | 180/90 |

FOREIGN PATENT DOCUMENTS

| | | |
|---|---|---|
| 46-34803 | 12/1971 | Japan . |
| 48-64646 | 9/1973 | Japan . |
| 48-33886 | 10/1973 | Japan . |
| 50-21849 | 3/1975 | Japan . |
| 51-81330 | 7/1976 | Japan . |
| 52-22737 | 5/1977 | Japan . |

*Primary Examiner*—Joseph F. Peters, Jr.
*Assistant Examiner*—Ross Weaver
*Attorney, Agent, or Firm*—Wenderoth, Lind & Ponack

[57] ABSTRACT

A steering column supporting structure for use in a motor vehicle which includes a vertical portion provided at approximately a central portion of a vehicle body, and a hollow horizontal structure extending laterally, at its base portion, from the upper portion of the vertical structure toward the side wall of the motor vehicle adjacent to the driver's seat. The lower end of the vertical structure is connected to a tunnel portion or raised portion of a vehicle floor with a high rigidity, while the other end of the horizontal structure at the side wall of the motor vehicle is connected to an inner side panel constituting a closed cross sectional structure together with a hinge pillar outer panel for the improvement of rigidity at the steering column supporting portion.

8 Claims, 4 Drawing Figures

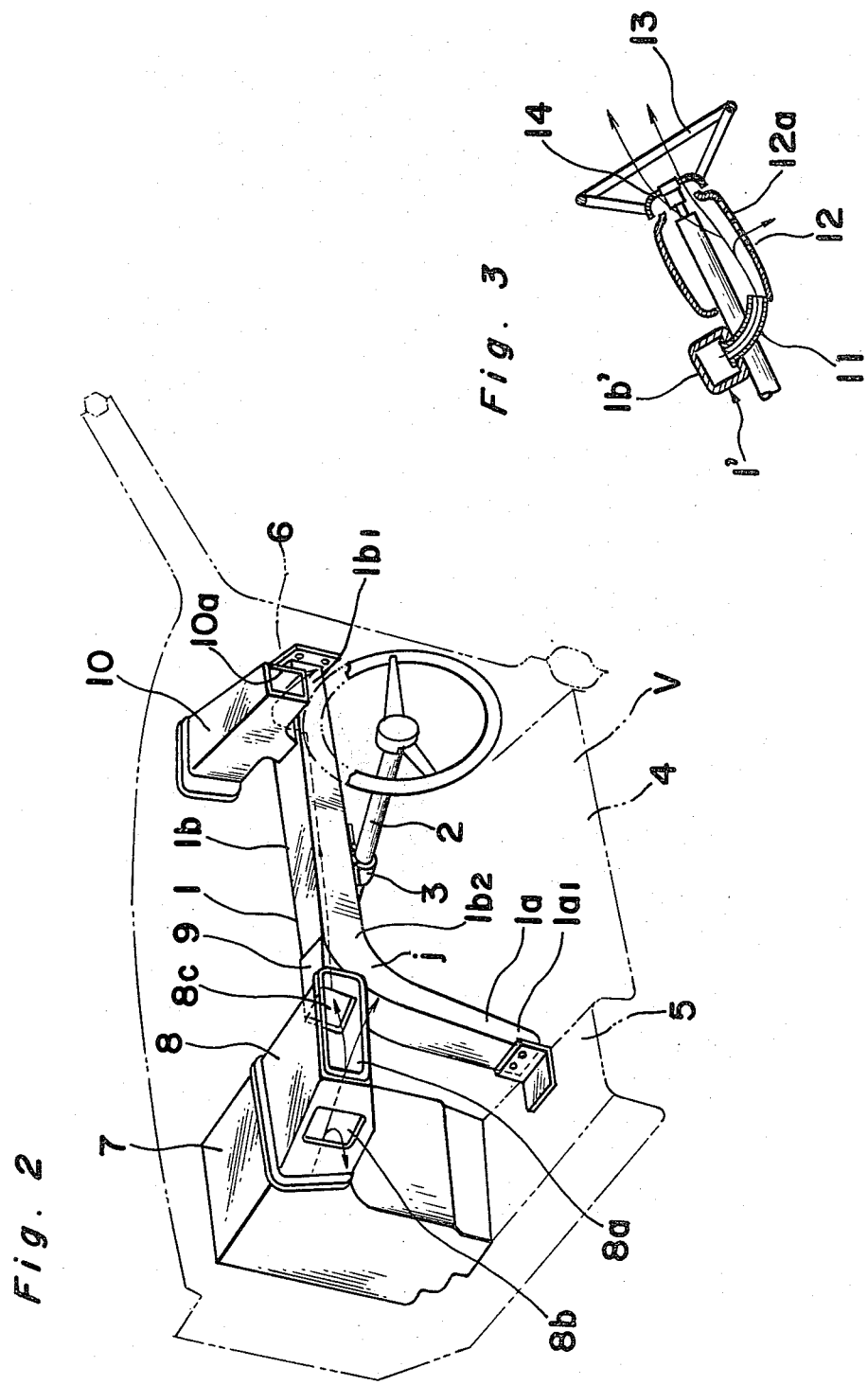

STEERING COLUMN SUPPORTING STRUCTURE FOR MOTOR VEHICLE

BACKGROUND OF THE INVENTION

The present invention generally relates to a motor vehicle and more particularly, to a supporting structure of a steering column at the instrument panel or dash panel portion of a motor vehicle.

Conventionally, for supporting a steering column on the body of a motor vehicle, there has been employed a structure in which the steering column is secured to the instrument panel or fixed to an inner side panel frame through a bracket or the like. However, in the arrangement for supporting the steering column on the inner side panel as described above, since rigidity of inner side panels tends to be poor due to the recent trend for producing them by plastic molding, there are such disadvantages that the steering wheel is subjected to vibrations during high speed driving through reduction of the rigidity of mounting or that sufficient rigidity of mounting can not be obtained owing to a considerably long span of the inner side panel in a lateral direction.

In conventional arrangements, air from an air conditioner such as a heater, cooler or the like is led through a duct toward the opposite sides of the forward portion of a driver's cab for being discharged therefrom, but such a duct has an undesirable bent or winding shape in order to avoid wirings in the lower portion of the instrument panel, the steering column and its supporting members and the like, and has such drawbacks that not only it is difficult to manufacture, but presents a large resistance to the air passing therethrough, with a simultaneous increase in its weight owing to the complicated configuration thereof. In order to overcome the disadvantages as described above, there have also been proposed recently certain arrangements in which simplification of the construction, utilization of limited spaces, etc. are sought by integrally forming the inner side panel and duct into one unit by molding or the like, but these prior art arrangements still have some problems to be solved for complete elimination of the drawbacks as described earlier.

SUMMARY OF THE INVENTION

Accordingly, an essential object of the present invention is to provide a steering column supporting structure for a motor vehicle which also serves as a ventilating structure, and in which vibrations of the steering wheel during high speed driving is sufficiently suppressed for an improved running stability.

Another important object of the present invention is to provide a steering column supporting structure of the above described type which is light in weight, with few bent portions, and having an efficient ventilating construction for utilization of limited spaces in a motor vehicle.

A further object of the present invention is to provide a steering column supporting structure of the above described type which can be readily manufactured on a large scale at low cost for incorporation into motor vehicles of various types.

In accomplishing these and other objects according to one preferred embodiment of the present invention, there is provided a steering column supporting structure which includes a vertical portion provided at approximately a central portion of a vehicle body, and a hollow horizontal structure extending laterally, at its base portion, from the upper portion of the vertical structure toward the side wall of the motor vehicle adjacent to the driver's seat. The lower end of the vertical structure is connected to a tunnel portion or raised portion of a vehicle floor with a high rigidity, while the other end of the horizontal structure at the side wall of the motor vehicle is connected to an inner side panel constituting a closed cross sectional structure together with a hinge pillar outer panel for the improvement of rigidity at the steering column supporting portion, thereby to reduce vibrations of the steering wheel for improved running stability and also to make it possible to use the horizontal structure as a duct for an air conditioner or the like for utilization of limited space and providing an efficient ventilating structure light in weight, with less bent or winding portions therein.

BRIEF DESCRIPTION OF THE DRAWINGS

These and other objects and features of the present invention will become apparent from the following description of a preferred embodiment thereof taken with reference to the accompanying drawings, in which;

FIG. 2 is a perspective view showing the general construction of the steering column supporting structure of FIG. 1, FIG. 3 is a fragmentary side sectional view showing a modification of the steering column supporting structure of FIG. 2.

Before the description of the present invention proceeds, it is to be noted that like parts are designated by like reference numerals throughout the several views of the accompanying drawings.

DETAILED DESCRIPTION OF THE INVENTION

Figure 1:
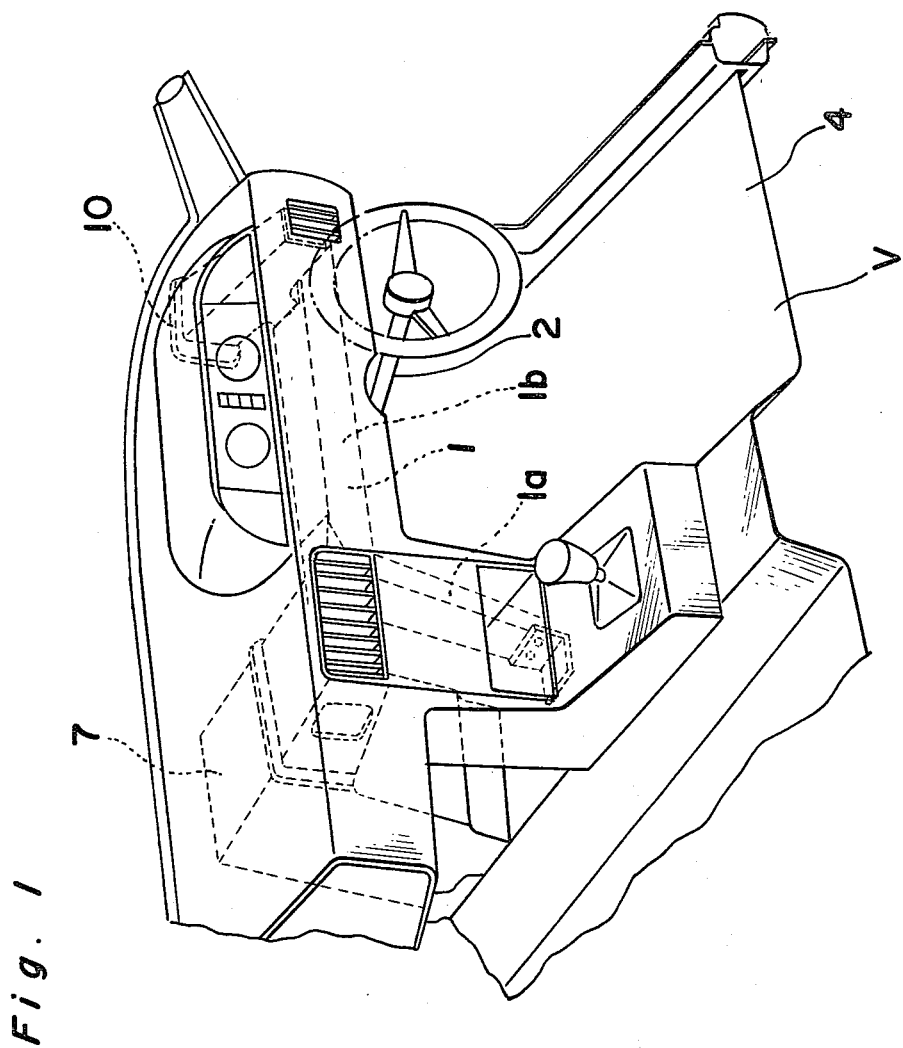
FIG. 1 is a schematic perspective view showing an arrangement of a steering column supporting structure within a motor vehicle according to one preferred embodiment of the present invention.

Referring now to the drawings, there is schematically shown in FIGS. 1 and 2, a steering column supporting structure 1 for supporting a steering column 2, for example, by a bracket member 3, which includes a vertical structure 1a provided at generally a central portion of a vehicle body V in a direction approximately perpendicular to a vehicle floor 4, and a hollow horizontal structure 1b extending laterally, at its base portion 1b2, from the upper portion of the vertical structure 1a in approximately a horizontal direction with respect to the vehicle floor 4 toward the right side or the side wall of the motor vehicle adjacent to the driver's seat. The lower end 1a1 of the vertical structure 1a is rigidly connected by suitable means to a hollow raised portion or tunnel portion 5 of the vehicle floor 4, while the distal end 1b1 of the horizontal structure 1b at the side wall of the motor vehicle adjacent to the driver's seat is secured to an inner side panel 6 constituting a hinge pillar which is a closed cross sectional structure together with a hinge pillar outer panel.

Meanwhile, at a rear portion of a heater unit 7 provided in a position adjacent to the vertical structure 1a of the supporting structure 1, there is mounted a center duct 8 which is formed with a front discharge port 8a at its front side, and side discharge ports 8b and 8c at the left and right sides thereof as shown in FIG. 2. The above discharge port 8c at the right side of the center duct 8 is communicated, through a connecting duct 9, with the base portion 1b2 of the horizontal structure 1b at the central portion of the vehicle body where the structure 1b extends laterally and horizontally from the upper portion of the vertical structure 1a, i.e. the portion thereof adjacent to a junction j between the vertical structure 1a and horizontal structure 1b of the supporting structure 1, while the portion of the horizontal structure 1b adjacent to its distal end 1b1 is communicated with a ventilator 10 provided at the front right side of the driver's seat and having an air blast port 10a at its front side for introduction of external air into the interior of the vehicle cab therethrough.

In the supporting structure 1 with the ventilating functions as described above, heated air from the heater unit 7 is discharged into the interior of the vehicle cab through the central discharge port 8a and a left air blast port of the ventilator (not shown) through the discharge port 8b at the left side of the center duct 8, and is also discharged from the right air blast port 10a of the ventilator 10 at the forward portion of the driver's seat through the discharge port 8b at the right side of the center duct 8, connecting duct 9, the horizontal portion of the horizontal structure 1b of the steering column supporting structure 1, and ventilator 10.

It is to be noted here that the arrangement of the steering column supporting structure 1 described so far may be so modified that the vertical structure 1a thereof is incorporated in a center console box (not shown) for connection also to the console box, or that the horizontal structure 1b having an independent frame structure is replaced by a duct member (not shown) constituted by fixing an open cross sectional member to a reverse surface of the inner side panel or an under cover (not shown) provided under the inner side panel for supporting the steering column by said duct member. In the above case, if sufficient supporting rigidity can not be obtained by merely securing the steering column to said duct member, the steering column may further be arranged to be also fixed to the inner side panel by a bracket or the like.

Referring to FIG. 3, there is shown another modification of the arrangement of FIG. 2. In this modification, the steering column supporting structure 1' further includes a column jacket 12 surrounding the portion of the steering column 2 between the steering wheel 13 and the horizontal structure 1b' and provided with a blast opening 14 facing a central portion of the steering wheel 13 and a plurality of blasting holes 12a formed in the under surface of the column jacket 12, and a duct or pipe member 11 extending from the horizontal structure 1b' into the lower portion of the jacket 12 for communication therewith. The air from the horizontal portion 1b' introduced into the jacket 12 through the duct member 11 is discharged from the blast opening 14 at the central portion of the steering wheel 13 and the blast holes 12a in the under surface of the column jacket 12.

Figure 4:
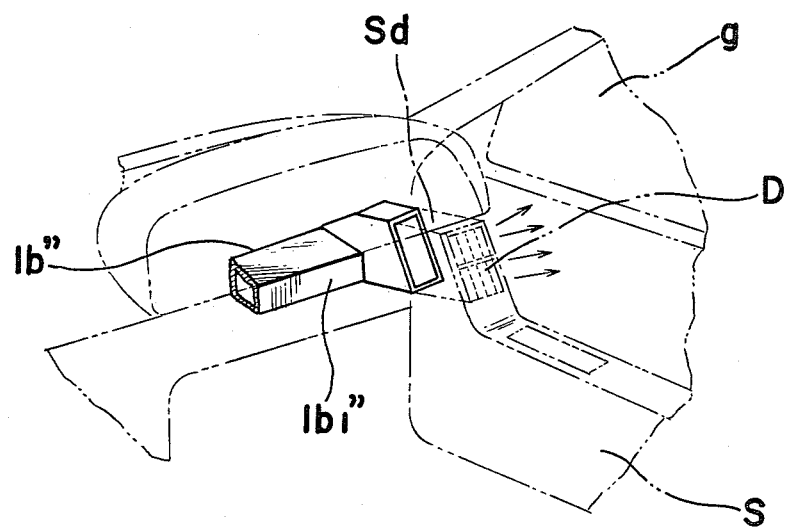
FIG. 4 is a fragmentary perspective view explanatory of a further modification of the steering column supporting structure of FIG. 2.

It should be noted here that the present invention is not limited in its arrangements to the foregoing embodiments, but may further be modified in various ways, for example, by replacing the heater unit with a cooling unit or with an air conditioner capable of effecting both heating and cooling. Similarly, as shown in FIG. 4, the air blast port 10a of the ventilator 10 described as provided at the forward portion of the driver's cab with reference to FIG. 2 may also be modified, for example, to a defrosting blast hole D formed by communicating the end portion 1b1'' of the horizontal structure 1b'' with a duct Sd built in the side door S for preventing clouding of a window glass pane g by directing the air flow thereto in the direction indicated by arrows.

As is clear from the foregoing description, according to the present invention, the steering column is arranged to be supported by the horizontal structure of the duct-like closed cross sectional construction, while the base portion of the horizontal structure at the central portion of the vehicle body is coupled through the vertical structure having a high ridigity, to the tunnel portion of the vehicle floor, with the other end of the horizontal structure at the side wall of the vehicle body also being connected to the hinge pillar or to the rigid inner side panel in the vicinity thereof, and therefore, the rigidity at the steering column supporting portion and the vicinity thereof is markedly increased for efficient suppression of the vibrations of the steering wheel. Furthermore, since the horizontal structure of the steering column supporting structure is made into a duct-like configuration, said horizontal structure can be advantageously utilized as the ventilating duct for an air conditioner, etc., and thus, not only is the duct or the like conventionally required dispensed with, but piping is greatly facilitated and effective utilization of limited spaces within a motor vehicle is achieved. Moreover, since the horizontal structure functioning as the duct is generally straight in its shape, with less resistance to flow of air, very efficient ventilation can be achieved with this simple construction.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A steering column supporting structure for use in a motor vehicle including a dash panel constituting a front wall of a cab for the motor vehicle, a floor panel extending rearwardly from the lower edge of the dash panel to constitute a vehicle floor and having a floor tunnel portion extending in a longitudinal direction of the vehicle body at a central portion of the motor vehicle so as to be raised into the cab, an inner side panel extending from a front edge of a door opening at the side wall of the cab to a side edge of the dash panel and forming a closed cross sectional structure together with a hinge pillar outer panel, and a steering column provided in the forward portion of the cab at a central portion with respect to the driver's seat and rotatably housing a steering shaft therein, said steering column supporting structure comprising a steering column supporting member constituted by a long closed cross-section hollow duct bent so as to have a vertical portion provided in the forward part of the cab and extending generally perpendicularly with respect to the vehicle floor at approximately a central portion of the vehicle body, and a horizontal portion extending from the upper end of said vertical portion and laterally toward the side wall of the motor vehicle adjacent to the driver's seat in a direction approximately horizontal with respect to the vehicle floor, said vertical portion being rigidly connected, at its lower end, to said floor tunnel portion of said vehicle floor, said horizontal portion being rigidly connected, at its other end at the side wall of the motor vehicle adjacent to the driver's seat, to said inner side pannel, said steering column being fixed to approximately a central part of said horizontal portion for being supported thereat.

2. A steering column supporting structure as claimed in claim 1, wherein said motor vehicle further has an air conditioner with an air discharge opening provided at the forward part of the cab and another air discharge opening at the side of the driver's seat, and the part of said horizontal portion at the central part of the cab is communicated with the air discharge opening of the air conditioner and said other end of said horizontal portion being communicated with said another air discharge opening.

3. A steering column supporting structure as claimed in claim 1, wherein said steering column has a steering wheel therein, said column supporting structure further including a column jacket member surrounding a portion of the steering column between the steering wheel and said horizontal portion and having an opening provided facing said steering wheel and a plurality of openings formed in the underside wall of said column jacket, and a duct member provided to communicate the horizontal portion with the lower portion of said column jacket.

4. A steering column supporting structure as claimed in claim 1, wherein said motor vehicle further has a duct member incorporated in a side door with a defrosting blast hole for directing air flow onto a window glass pane to prevent clouding thereof, the other end of said horizontal portion being communicated with said duct member.

5. A steering column supporting structure for use in a motor vehicle including a dash panel constituting a front wall of a cab for the motor vehicle, a floor panel extending rearwardly from the lower edge of the dash panel to constitute a vehicle floor and having a floor tunnel portion extending in a longitudinal direction of the vehicle body at a central portion of the motor vehicle so as to be raised into the cab, an inner side panel extending from a front edge of a door opening at the side wall of the cab to a side edge of the dash panel and forming a closed cross sectional structure together with a hinge pillar outer panel, and a steering column provided in the forward portion of the cab at a central portion with respect to the driver's seat and rotatably housing a steering shaft therein, said steering column supporting structure having a steering column supporting member with one end rigidly connected to the floor tunnel portion and the other end rigidly connected to the inner side panel, said supporting member being constituted by a long closed cross-section hollow duct having a vertical portion extending upwardly from said one end and a horizontal portion bent from said vertical section and extending between the upper end of the vertical portion and said other end, said steering column being supported by said horizontal portion.

6. A structure as claimed in claim 5, wherein said motor vehicle has an air conditioner with an air discharge opening installed frontwardly of the interior of the vehicle and providing a passage for the introduction of the air therefrom into the interior of the vehicle, said horizontal portion of said steering column support member being communicated with said air discharge opening.

7. A structure as claimed in claim 6, wherein said motor vehicle has a discharge port for the introduction of air from the outside into the interior of the vehicle, and the horizontal portion of said steering column supporting member is communicated at a position adjacent said other end to said discharge port.

8. A structure as claimed in claim 6, wherein said motor vehicle further has a duct member incorporated in a side door with a defrosting blast hole for directing air flow onto a window glass pane to prevent clouding thereof, the other end of said horizontal portion being communicated with said duct member.

* * * * *